2,244,578

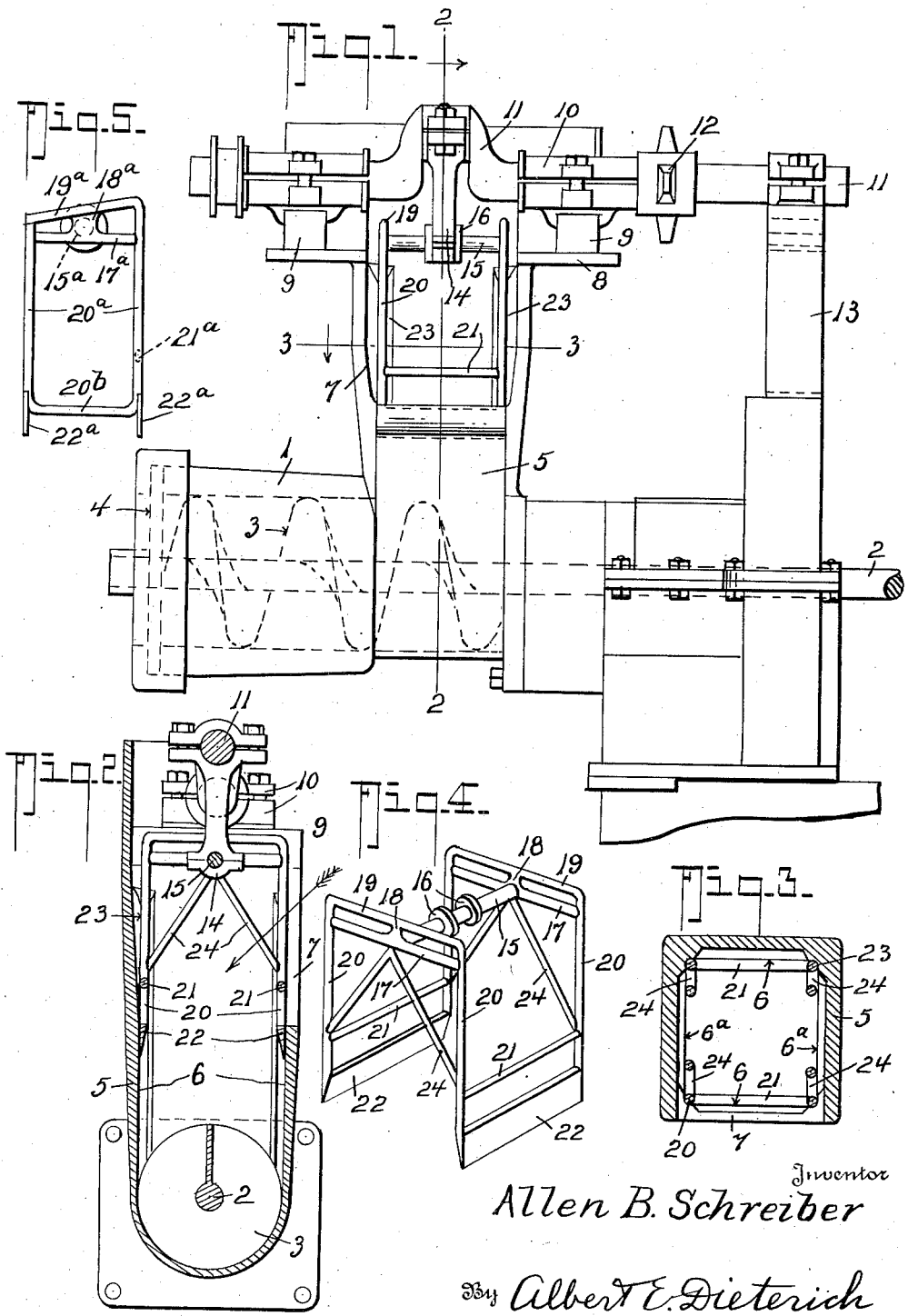
June 3, 1941. A. B. SCHREIBER 2,244,578
AGITATOR-FEEDER FOR STICKY MASSES
Filed July 26, 1940
Inventor
Allen B. Schreiber
By Albert E. Dieterich
Attorney Patented June 3, 1941

UNITED STATES PATENT OFFICE 2,244,578

AGITATOR-FEEDER FOR STICKY MASSES

Allen B. Schreiber, St. Joseph, Mo.

Application July 26, 1940, Serial No. 347,815

7 Claims. (Cl. 107—14)

My present invention relates to machines for forming food products composed of sticky masses such, for instance, as the product disclosed in Letters Patent 1,638,963 issued to me on August 16, 1927.

In forming the material into short cylindrical particles, the mass is usually die-expressed by a suitable machine into which the sticky mass is fed through an opening in the top of the machine, by gravity. In such machines, it has been found that the sticky mass fed into the throat of the opening tends to adhere to the walls of the throat and prevent the material gravitating properly to the expressing screw or plunger device.

Various means have been tried to overcome this defect in the machines heretofore used but none have been found satisfactory except that which I have devised and which constitutes the subject matter of the present application.

Generically, the present invention resides in providing a reciprocating feeder-agitator of a skeleton or cage-like form so designed as to scrape the walls to which the sticky mass adheres and effect agitation of the mass principally adjacent such walls and thereby preventing the mass from sticking to the walls and allowing it to gravitate freely to the expressing screw or plunger.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which—

Figure 1 is a side elevation of a portion of a die-expressing machine of the screw type with my invention applied.

Figure 2 is a cross section on the line 2—2 of Figure 1.

Figure 3 is a detail section on the line 3—3 of Figure 1.

Figure 4 is a detail perspective view of the reciprocatable agitator-feeder.

Figure 5 is a detail elevation of a modification of the unit shown in Figure 4.

Referring now to the accompanying drawing in which like numerals of reference indicate like parts on all the figures:

1 represents the casing of the die-expressing machine, 2 the worm shaft, 3 the worm, and 4 the die plate.

5 indicates the throat through which the material is delivered to the entrant end of the casing 1 where it is taken up by the screw 3 and fed toward and forced through the die plate 4.

Above the throat 5, there is a mouth 7 through which the sticky material is introduced to the machine.

6 designates the side walls of the throat 5 and 6a the end walls thereof below the mouth opening.

8 designates suitable brackets on which the spacers 9 are mounted. The spacers 9 carry the bearings 10 for the crank shaft 11 which may be driven in any suitable way as by a driving chain, not shown, connected to the driven sprocket 12. An auxiliary or supplemental bearing 13 is provided for the end of the shaft on the sprocket side.

14 is the pitman or connecting rod mounted on the crank shaft 11 and on the cross bar or shaft 15 between the discs 16 of the agitator-scraper.

The agitator-scraper is preferably composed of two inverted U-members each composed of a top bar 19 and legs 20. The two inverted U-members 19 and 20 are connected together by rods 21 and scraper blades or plates 22.

The shaft or cross bar 15 at its ends is connected to rods or bars 17 that parallel the top bars 19 and are permanently connected to the legs 20 adjacent the bars 19. The bars or rods 17 are also connected to the rods or bars 19 as at 18.

Diagonal brace rods or bars 24 lying in the planes of the inverted U-shaped members may also be provided as desired. These diagonal braces 24 also serve as scrapers for the front and back walls 6a—6a of the throat 5.

The vertical legs 20 of the inverted U-members slide up and down in corner slide ways 23 of the throat casting as is clearly indicated in Figures 1, 2, and 3.

Power is applied to the shaft 2 in any suitable way to cause the screw 3 to operate. At the same time, power is applied to the crank shaft 11 to effect vertical reciprocation of the agitator-scraper from the elevated position of Figure 1 to a position 180 degrees therefrom and vice versa, thereby effecting a continuous agitation and scraping of the material adjacent the walls of the throat and preventing adhesion thereto and thus allowing the material, which is introduced through the mouth 7 in the direction of the arrow in Figure 2, to freely work down to the screw 3.

The agitator-scraper or cage shown in Figure 4 can be made of wire rod save for the plates 22 and is easily cleaned. Since the agitator-scraper is in the form of a cage and the bars 21 and 22 are located near the lower end of the same, they do not interfere with the free introduction of the material through the mouth 7 during the reciprocation of the agitator-scraper.

Instead of making the frames as inverted U-members, they may be made as a closed frame as shown in Figure 5 by reference to which it will be seen that the vertical rods or bars 20a are connected at the bottom as at 20b as well as at the top as at 20c. Plates 22a connect the two frames similarly to the plates 22 in Figure 4. In this modification also only one brace 21 is used and that on the side of the agitator-feeder which is opposite the mouth 7. Furthermore, in this embodiment of the invention, the diagonal braces 24 shown in Figure 4 are omitted.

I wish it understood that I do not desire to limit myself to the exact details of construction shown and described, but that these details may readily be varied without departing from the spirit of the invention within the scope of the appended claims.

What I claim is:

1. In a machine of the character described, a throat through which material is fed into the machine, in combination with a reciprocating agitator and throat-wall scraper comprising a skeleton formed of rods and thin blades and operating in said throat, and means to operate the same.

2. In a machine of the character described, a throat through which material is fed into the machine, in combination with a reciprocating agitator and throat-wall scraper operating in said throat, and means to operate the same, said agitator and throat-wall scraper comprising a skeleton composed of two inverted U-members to lie adjacent the front and back walls of the throat, and connecting members between said two inverted U-members and lying adjacent the side walls of the throat, and a cross bar between said two inverted U-members to which said operating means is connected.

3. In a machine of the character described, a throat through which material is fed into the machine, in combination with a reciprocating agitator and throat-wall scraper operating in said throat, and means to operate the same, said agitator and throat-wall scraper comprising a skeleton composed of two inverted U-members to lie adjacent the front and back walls of the throat, and connecting members between said two inverted U-members and lying adjacent the side walls of the throat, and a cross bar between said two inverted U-members to which said operating means is connected, said connecting members including scraper plates connecting the legs of one inverted U-member to the legs of the other inverted U-member.

4. In a machine of the character described, a throat through which material is fed into the machine, in combination with a reciprocating agitator and feeder comprising a skeleton structure formed of connected rod-like elements operating in said throat and means to operate the same.

5. In a machine of the character described, a throat through which material is fed into the machine, in combination with a reciprocating agitator and feeder operating in said throat and means to operate the same, said reciprocating agitator and feeder comprising a cage-like structure including end frames connected together at their bottoms by means of plates serving as wall scrapers.

6. In a machine of the character described, a throat through which material is fed into the machine, in combination with a reciprocating agitator and feeder operating in said throat and means to operate the same, said reciprocating agitator and feeder comprising a cage-like structure including end frames connected together at their bottoms by means of plates serving as wall scrapers, said frames comprising parallel upright rods spaced apart and connected top and bottom by cross rods.

7. In a machine of the class described, a throat through which material is fed into the machine, in combination with a reciprocating agitator and throat-wall scraper operating in said throat, and means to operate the same, said agitator and throat-wall scraper including a skeleton frame of rods carrying wall-scraper plates to engage a pair of opposite walls of the throat and scrape same.

ALLEN B. SCHREIBER.